US005956055A

United States Patent [19]

Gibson et al.

[11] Patent Number: 5,956,055

[45] Date of Patent: Sep. 21, 1999

[54] METHOD OF COMPENSATING FOR SKEWED PRINTING IN AN INK JET PRINTER

[75] Inventors: Bruce David Gibson, Lexington; Kent Lee Ubellacker, Georgetown; John Dennis Zbrozek, Lexington, all of Ky.

[73] Assignee: Lexmark International, Inc., Lexington, Ky.

[21] Appl. No.: 08/948,982

[22] Filed: Oct. 10, 1997

[51] Int. Cl.$^6$ .............................. B41J 29/38; G01D 15/18

[52] U.S. Cl. .................................. 347/40; 347/41; 347/43

[58] Field of Search .................................. 347/40, 41, 43, 347/9

[56] References Cited

U.S. PATENT DOCUMENTS

| | | | |
|---|---|---|---|
| 4,493,570 | 1/1985 | Araki | 400/144.2 |
| 4,577,197 | 3/1986 | Crean et al. | 346/75 |
| 4,758,106 | 7/1988 | Yasui et al. | 400/323 |
| 4,800,396 | 1/1989 | Hertz | 347/19 |
| 4,818,129 | 4/1989 | Tanuma et al. | 400/323 |
| 4,878,063 | 10/1989 | Katerberg | 347/19 |
| 4,971,464 | 11/1990 | Shikanai | 400/323 |
| 5,049,898 | 9/1991 | Arthur et al. | 347/19 |
| 5,069,556 | 12/1991 | Sasaki et al. | 400/74 |
| 5,109,239 | 4/1992 | Cobbs et al. | 347/19 |
| 5,116,150 | 5/1992 | Courtney | 400/320 |
| 5,128,691 | 7/1992 | Millet et al. | 347/19 |
| 5,250,956 | 10/1993 | Haselby et al. | 343/19 |
| 5,289,208 | 2/1994 | Haselby et al. | 347/19 |
| 5,297,017 | 3/1994 | Haselby et al. | 347/19 |
| 5,448,269 | 9/1995 | Beauchamp et al. | 347/19 |
| 5,454,651 | 10/1995 | Tateyama | 400/323 |
| 5,534,895 | 7/1996 | Lindenfelser et al. | 347/19 |
| 5,561,449 | 10/1996 | Raskin et al. | 347/37 |

*Primary Examiner*—N. Le
*Assistant Examiner*—Lamson D. Nguyen
*Attorney, Agent, or Firm*—John J. McArdle, Jr.; Ronald K. Aust

[57] ABSTRACT

A method of printing with an ink jet printer compensates for skewed printing on a print medium. An image area is defined on the print medium which has a plurality of rows of pixel locations and a plurality of columns of pixel locations. A printhead includes a plurality of vertically adjacent ink emitting orifices arranged in an array having a height. The printhead is scanned during first and second scans across the print medium in directions transverse to the advance direction. The ink is jetted onto the print medium from the ink emitting orifices during the first and second scans at selected ink dot placement locations generally corresponding to one of the columns of pixel locations. An offset is determined in a transverse direction between a bottom ink dot placement location associated with the first scan and a top ink dot placement location associated with the second scan. The array of ink emitting orifices is segmented into at least two vertically adjacent segments of ink emitting orifices. The ink dot placement locations associated with at least one of the segments is shifted in a direction transverse to the advance direction a distance which is dependent upon the determined offset. The ink dot placement locations associated with at least one other of the segments remains unchanged. Printing on the print medium is carried out using the shifted ink dot placement locations.

9 Claims, 2 Drawing Sheets

METHOD OF COMPENSATING FOR SKEWED PRINTING IN AN INK JET PRINTER

BACKGROUND OF THE INVENTION

1. Field of the Invention

The present invention relates to a method of printing using an ink jet printer, and, more particularly, to a method of compensating for skewed printing using an ink jet printer.

2. Description of the Related Art

Ink jet printers typically include a printhead which is carried by a carriage assembly which is moved in transverse directions across the print medium, relative to the advance direction of the print medium within the printer. For a mono-color printhead used to jet a single color ink, e.g., black ink, onto the print medium, the printhead is scanned across the print medium in one transverse direction, advanced a distance corresponding to the height of the printhead, and scanned in a return direction back across the print medium in an opposite direction. Ink is jetted from the ink emitting orifices in the printhead as the printhead scans in the transverse directions across the print medium. An image area is defined via software which overlies the print medium. The image area includes a plurality of rows of pixel locations and a plurality of columns of pixel locations. As each ink emitting orifice is scanned across an associated pixel location on the image area, a determination is made as to whether ink is to be jetted from the associated ink emitting orifice onto the print medium at the selected pixel location. By sequentially scanning the printhead across the print medium and advancing the print medium during scans a distance corresponding to the height of the printhead, ink may be selectively jetted onto the print medium at any pixel location within the image area.

One known type of error associated with ink jet printing is referred to as a "rotational error" caused by a skewed positioning of the ink emitting orifices relative to the advance direction of the print medium. Such a rotational error may result from rotational inaccuracies of the ink emitting orifices within the nozzle plate on the printhead, rotational errors of the nozzle plate relative to the remainder of the printhead, rotational errors of the printhead relative to the carriage assembly, and rotational errors of the carriage relative to the scanning axis.

A noticeable defect which may be associated with rotational errors is the formation of a horizontal line between scans of the printhead. That is, the rotational error reduces the projected height of the array of ink emitting orifices and the advance distance between scans is calculated based on a vertically aligned printhead. Another type of defect associated with rotational errors is a noticeable offset in the transverse direction between vertically adjacent scans of the printhead across the print medium. For example, to print a vertical line, the printhead is scanned in a first transverse direction and the ink jetting heaters are fired at selected points in time corresponding to a column of pixel locations on the image area. The paper is then advanced a distance corresponding to the height of the printhead and the printhead is scanned in an opposite direction and the ink jetting heaters are fired at selected points in time corresponding to the same column of pixel locations on the image area. Since each column of ink dot placement locations on the print medium is in fact rotationally skewed relative to the advance direction, an offset or error in the transverse direction occurs between the bottom-most ink dot placement location of the first scan and the top-most ink dot placement location of the second scan. This offset or error in the transverse direction may be objectionably perceptible to the user, depending upon the severity thereof.

One known method of compensating for rotational errors is to advance or delay the firing times of the ink jetting heaters associated with each ink emitting orifice such that the rotationally skewed column of ink dot placement locations is rotated back to a substantially vertical orientation relative to the advance direction. However, advancing or delaying the firing time associated with each ink emitting orifice such that the entire rotationally skewed array of ink dot placement locations is rotated in one direction or the other requires a substantial amount of computational processing. Such a method therefore requires additional computing time and also may increase the cost of the machine because of the associated electrical processing hardware.

What is needed in the art is a method of compensating for skewed printing in an ink jet printer caused by rotational errors which does not require unnecessary processing time or circuitry, compensates for the rotational error to an acceptable level, and allows the amount of compensation to be varied.

SUMMARY OF THE INVENTION

The present invention provides a method of compensating for skewed printing with an ink jet printer by segmenting the array of ink emitting orifices on the printhead and shifting at least one of the segmented arrays in a direction transverse to the advance direction of the print medium.

The invention comprises, in one form thereof, a method of compensating for skewed printing on a print medium with an ink jet printer. An image area is defined on the print medium which has a plurality of rows of pixel locations and a plurality of columns of pixel locations. A printhead includes a plurality of vertically adjacent ink emitting orifices arranged in an array having a height. The printhead is scanned during first and second scans across the print medium in directions transverse to the advance direction. The ink is jetted onto the print medium from the ink emitting orifices during the first and second scans at selected ink dot placement locations generally corresponding to one of the columns of pixel locations. An offset is determined in a transverse direction between a bottom ink dot placement location associated with the first scan and a top ink dot placement location associated with the second scan. The array of ink emitting orifices is segmented into at least two vertically adjacent segments of ink emitting orifices. The ink dot placement locations associated with at least one of the segments is shifted in a direction transverse to the advance direction a distance which is dependent upon the determined offset. The ink dot placement locations associated with at least one other of the segments remains unchanged. Printing on the print medium is carried out using the shifted ink dot placement locations.

An advantage of the present invention is that the offset error in the transverse direction between vertically adjacent ink dot placement locations is compensated.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
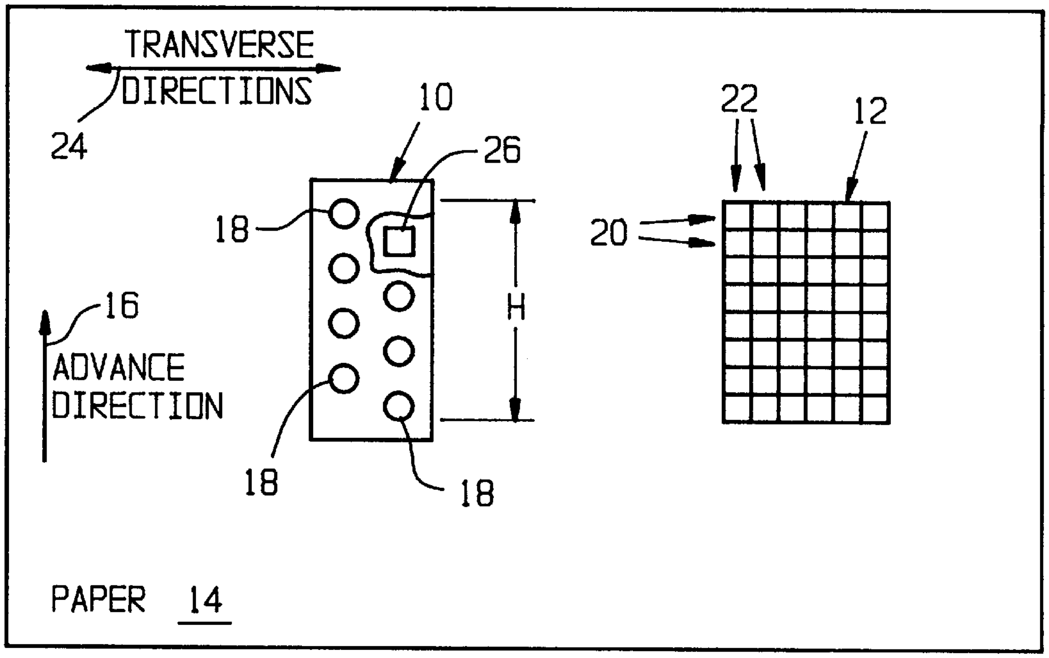
FIG. 1 is a schematic view of an exemplary printhead which may be used with the method of the present invention, shown in relationship to a portion of an image area on a print medium.

Referring now to the drawings and particularly to FIG. 1, there is shown a schematic view of an exemplary printhead 10 of an ink jet printer which may be used with method of the present invention, shown in relationship to a portion of an image area 12 on a print medium 14. Paper 14 is movable in an advance direction within the ink jet printer, indicated by arrow 16.

Printhead 10 includes a plurality of ink emitting orifices 18 which are arranged in an array of vertically adjacent ink emitting orifices. For manufacturing purposes, the vertically adjacent ink emitting orifices 18 are disposed in a staggered relationship relative to each other. That is, the bottom ink emitting orifice 18 shown in the right hand column is disposed vertically adjacent to the bottom ink emitting orifice shown in the left hand column. In the embodiment shown, printhead 10 includes eight ink emitting orifices which are arranged in a staggered and vertically adjacent relationship relative to each other. The array of eight ink emitting orifices 18 has a height H extending from the top-most ink emitting orifice 18 to the bottom-most ink emitting orifice 18.

Printhead 10 is carried in known manner by a carriage assembly which is movable in directions transverse to advance direction 16, as indicated by double-headed arrow 24. The carriage assembly and printhead 10 may be configured for single directional printing or bi-directional printing, in known manner.

Image area 12 overlying at least a portion of paper 14 is defined in part by the vertical spacing between adjacent ink emitting orifices 18. Image area 12 includes a plurality of rows of pixel locations 20 and a plurality of columns of pixel locations 22. Each pixel location within each row 20 of pixel locations has a height which corresponds to a height of an associated ink emitting orifice 18 on printhead 10. Moreover, in the embodiment shown, each pixel location within each column 22 of pixel locations has a width which corresponds to the height dimension of each row 20. That is, each pixel location is substantially square. However, it is also to be understood that each pixel location may have a width which differs from the height, dependent upon the addressable resolution of the stepper motor which drives the carriage assembly carrying printhead 10.

Printhead 10 includes a plurality of ink jetting heaters, one of which is shown and referenced as 26 in FIG. 1, which are respectively associated with the plurality of ink emitting orifices 18. Each ink jetting heater is actuatable at selected points in time during a scan of printhead 10 across paper 14 to jet the ink from an associated ink emitting orifice 18. Actuation of an ink jetting heater 26 at a selected point in time causes the rapid formation of a bubble at the base of an associated ink emitting orifice 18, thereby jetting the ink onto paper 14 in known manner.

Figure 2:
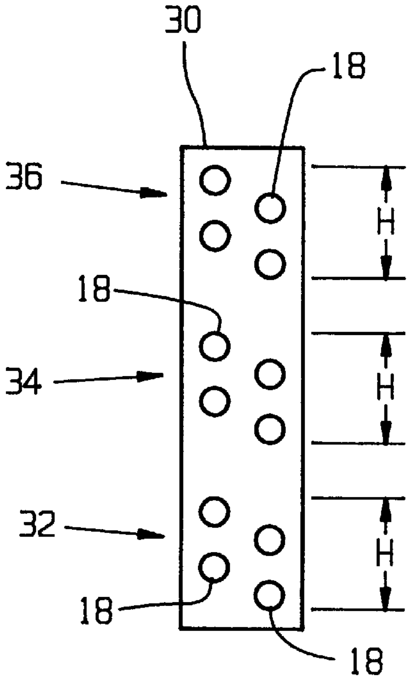
FIG. 2 is a schematic view of another exemplary printhead which may be used with the method of the present invention.

FIG. 2 is a schematic illustration of another exemplary printhead 30 which may be used with the method of the present invention. In contrast with printhead 10 shown in FIG. 1, printhead 30 shown in FIG. 2 includes three separate arrays 32, 34 and 36 of ink emitting orifices 18. Each array 32, 34 and 36 includes four ink emitting orifices 18 which are disposed in a staggered and vertically adjacent relationship relative to each other. That is, the bottom-most ink emitting orifice 18 in the right hand column of array 32 is disposed staggered and vertically adjacent relative to the bottom-most ink emitting orifice in the left hand column of array 32. Each array 32, 34 and 36 of ink emitting orifices 18 has a common height H extending from an associated top-most ink emitting orifice 18 to a bottom-most ink emitting orifice 18. Array 32 is used to jet cyan ink onto paper 14; array 34 is used to jet yellow ink onto paper 14; and array 36 is used to jet magenta ink onto paper 14. Thus, printhead 30 corresponds to a tri-color printhead used for carrying out multi-color printing. It will be appreciated that the number of ink emitting orifices 18 within each array 32, 34 and 36 may vary from that shown, and the physical position of the cyan, yellow and magenta arrays relative to each other may vary.

Figure 3:
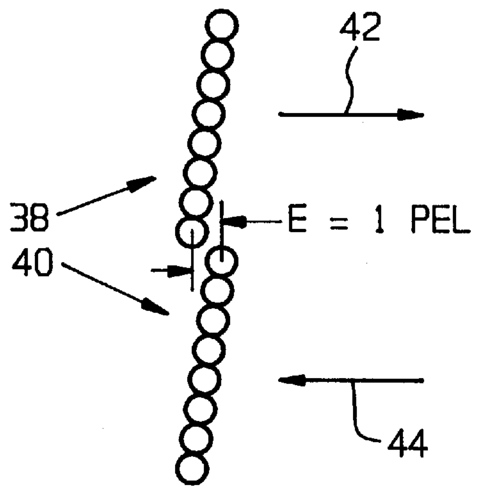
FIG. 3 illustrates an offset error between skewed columns of ink dot placement locations during first and second scans of the printhead.

FIG. 3 illustrates an offset error E between skewed columns of ink dot placement locations which are printed during adjacent scans of printhead 10. The skewed column of ink dot placement locations 38 correspond to ink dot placement locations which are generally associated with one of the columns 22 of pixel locations in image area 12 during a first scan of printhead 10 across paper 14. Printhead 10 may be moved in a direction from left to right as indicated by arrow 42, relative to advance direction 16. A second skewed column of ink dot placement locations 40 correspond to ink dot placement locations which are generally associated with the same column 22 of pixel locations in image area 12 during a second scan of printhead 10 across paper 14. Printhead 10 may be moved in a direction from right to left during the second scan as indicated by arrow 44, relative to advance direction 16.

The skewed angular relationship of each column of ink dot placement locations 38 and 40 may result from alignment inaccuracies of ink emitting orifices 18 in the nozzle plate forming a part of printhead 10; rotational errors between the nozzle plate and printhead 10; rotational errors between printhead 10 and the carriage assembly; and rotational errors of the carriage relative to the scanning axis. Such rotational errors cause the entire column of ink dot placement locations 38 and 40 to be rotated relative to advance direction 16. This in turn causes the bottom-most ink dot placement location in skewed column 38 to be offset in the transverse direction relative to the top ink dot placement location in skewed column 40. If this offset or error E in the transverse direction exceeds a certain threshold value, the offset will be perceptible to a user. For example, in the embodiment shown, each ink dot placement location within skewed columns 38 and 40 has a corresponding pixel size associated with image area 12 of 600 dots per inch (DPI). It has been found desirable to not exceed an error E in the transverse direction of greater than one pixel or PEL (approximately 0.00167 inch) so that the rotational error associated with the skewed columns 38 and 40 is not readily perceptible to a user. The maximum acceptable error may thus be expressed as a percentage of the pixel size associated with each ink dot placement location in columns 38 and 40. Although a pixel size of 600 DPI is shown in FIG. 3, it will also be appreciated that other pixel sizes may be used with the method of the present invention (e.g., 300 DPI at 0.00333 inch). Moreover, the acceptable percentage of offset or error E may vary dependent upon the particular application.

Figure 4:
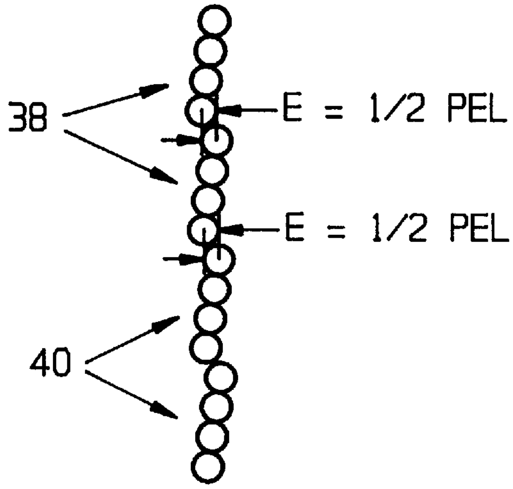
FIG. 4 illustrates one embodiment of the method of the present invention for compensating for the skewed columns of ink dot placement locations shown in FIG. 3.

Referring now to FIG. 4, there is shown an illustration of one embodiment of the method of the present invention for compensating for the skewed columns of ink dot placement locations shown in FIG. 3. The array of ink emitting orifices 18 of printhead 10 is segmented into two vertically adjacent segments of ink emitting orifices. The top segment, including the top four ink emitting orifices 18 on printhead 10 defines a top segment while the bottom four ink emitting orifices 18 on printhead 10 define a bottom segment. The ink dot placement locations for at least one of the segments within each column of ink dot placement locations 38 and 40 is shifted in a transverse direction relative to advance direction 16, dependent upon the determined offset or error E. At the same time, the ink dot placement locations associated with at least one other segment remain unchanged. In the embodiment shown in FIG. 4, the top four ink dot placement locations within column 38 are shifted ½ PEL to the left, while the bottom four ink dot placement locations associated with skewed row 38 remain unchanged. Thus, an error of approximately ½ PEL is intentionally introduced between the top segment and bottom segment of skewed row 38 of ink dot placement locations. On the other hand, it may also be readily observed that the top segment of column 40 is shifted ½ PEL to the left with respect to the unchanged bottom segment of column 38. This in fact reduces the offset or error E between the bottom of column 38 and the top of column 40 to approximately ½ PEL. Clearly, for the embodiment shown in FIG. 4, the maximum offset or error E in a transverse direction observed by a user is approximately ½ PEL. Since an offset or error E of approximately ½ PEL is not usually readily observable by a user, the method of the present invention provides an improved compensation of rotational errors caused by skewed columns of ink dot placement locations on paper 14.

In contrast with conventional methods of compensating for skewed ink dot placement locations, the present invention does not attempt to rotate the ink dot placement locations back to a vertical orientation relative to the advance direction. Rather, the method of the present invention leaves intact the skewed orientation between the various ink dot placement locations, and instead reduces the maximum error between any two vertically adjacent ink dot placement locations in a transverse direction to an acceptable level which is not normally objectionable to a user.

In the embodiment of the method of the present invention shown in the drawings, the determined offset or error E in the transverse direction is approximately 1 PEL (FIG. 3) and the compensated offset or error E is approximately ½ PEL. The ink emitting orifices 18 are segmented into two segments such that the compensated error may be reduced to ½ PEL. It will also be appreciated, however, that the array of ink emitting orifices 18 may be segmented into a larger number of segments such as three or four segments. Generally speaking, a larger number of segments allows a larger offset or error E to be accommodated and/or allows the compensated offset or error E in the transverse direction to be smaller.

During use, after the first scan 42 and second scan 44 have been used to determine the offset or error E, the segmented array of ink emitting orifices are selectively used to jet ink onto paper 14 at the shifted ink dot placement locations associated with each column 38 and 40 shown in FIG. 4. More particularly, the selected points in time at which the ink jetting heaters 26 associated with the top and bottom segments of ink dot placement locations within each column 38 and 40 are advanced, delayed or remain unchanged to shift the segmented ink dot placement locations as shown.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of compensating for skewed printing on a print medium with an ink jet printer, the print medium being movable in an advance direction in the ink jet printer, said-method comprising the steps of:

- defining an image area on the print medium having a plurality of rows of pixel locations and a plurality of columns of pixel locations;
- providing a printhead including a plurality of ink emitting orifices, said plurality of ink emitting orifices being arranged in an array of vertically adjacent ink emitting orifices, said array of ink emitting orifices having a height;
- scanning said printhead in a first scan across the print medium in a direction transverse to the advance direction;
- jetting an ink onto the print medium from said ink emitting orifices during said first scan at selected ink dot placement locations in one of said columns of pixel locations;
- advancing the print medium in the advance direction a distance corresponding to the height of said array of ink emitting orifices;
- scanning said printhead in a second scan across the print medium in a direction transverse to the advance direction;
- jetting the ink from said ink emitting orifices during said second scan at selected ink dot placement locations in said one column of pixel locations;
- determining an offset in a direction transverse to the advance direction between a bottom ink dot placement location associated with said first scan and a top ink dot placement location associated with said second scan;
- segmenting the array of ink emitting orifices into at least two vertically adjacent segments of ink emitting orifices;
- shifting the ink dot placement locations associated with at least one of said segments in a direction transverse to the advance direction a distance which is dependent upon said determined offset, the ink dot placement locations associated with at least one other of said segments remaining unchanged; and
- printing on the print medium using said shifted ink dot placement locations.

2. The method of claim 1, wherein said printing step comprises:

- scanning said carriage assembly in a third scan across the print medium in a direction transverse to the advance direction; and jetting the ink onto the print medium from said at least two segments of ink emitting orifices during said third scan at selected ones of said shifted ink dot placement locations and said unchanged ink dot placement locations.

3. The method of claim 1, wherein each said pixel location has a pixel size, and wherein said segmenting step and said shifting step are only carried out if said determined offset is greater than a predetermined percentage of said pixel size.

4. The method of claim 3, wherein said predetermined percentage is approximately equal to said pixel size.

5. The method of claim 4, wherein said pixel size is approximately 0.00333 inch.

6. The method of claim 4, wherein said pixel size is approximately 0.00167 inch.

7. The method of claim 1 wherein said printhead includes a plurality of ink jetting heaters respectively associated with said plurality of ink emitting orifices, each said ink jetting heater being actuatable to jet the ink from an associated said ink emitting orifice, and wherein said shifting step comprises one of advancing and delaying at least one time at which at least one said ink jetting heater is actuated.

8. The method of claim 1, wherein each said pixel location has a pixel size, and wherein said segmenting step comprises segmenting said array of ink emitting orifices into two vertically adjacent segments of ink emitting orifices, and wherein said shifting step comprises shifting the ink dot placement locations associated with one of said two segments in a direction transverse to the advance direction a distance corresponding to approximately one-half said pixel size.

9. The method of printing of claim 1, wherein the ink comprises one of a black ink, cyan ink, yellow ink and magenta ink.

* * * * *